FIG_1

United States Patent Office 3,306,098
Patented Feb. 28, 1967

3,306,098
PROCESS FOR MASS TESTING OF SMALL, CLOSED, GAS FILLED CONTAINERS
Thaddäus Kraus, Vaduz, Principality of Liechtenstein, assignor, by mesne assignments, to Bendix Balzers Vacuum, Inc., Rochester, N.Y., a corporation of Delaware
Filed June 4, 1964, Ser. No. 372,499
1 Claim. (Cl. 73—49.3)

The invention presented herewith concerns a procedure for the mass testing of small, closed, gas filled containers, e.g., watch cases for leaks. It has already been suggested to place such test pieces into an experimental chamber which can be evacuated and connected with a pressure measurement and control device which picks up any excess over a predetermined pressure limit; and to evacuate this experimental chamber to a predetermined low pressure, for instance, $10^{-3}$ torr, then seal it off and observe if, within a certain period of time, the pressure increases. Provided that the wall of the experimental chamber has no leaks to the outer atmosphere, an increase in pressure would mean that air is entering the evacuated chamber from the test piece, i.e., the test piece is not leak tight. The size of the leak can be calculated from the increase in pressure or the time which is necessary for a certain pressure increase.

Such a procedure would have a decided disadvantage for testing a series of, for instance, mass produced watch cases. It would become apparent that very small leaks can indeed be detected but that it is impossible to distinguish very large leaks from leak tight cases because the highly defective cases are evacuated with the experimental chamber so that during the following pressure increase test, no gas will enter the experimental chamber or not enough gas to measure. This problem is not encountered in testing the interior of the wall of a chamber because the atmosphere on the outside represents an inexhaustible gas reservoir. Therefore a particularly high increae in pressure is obtained with a large leak.

It is the purpose of the invention to establish a procedure and an arrangement which will detect small as well as large leaks in closed, gas filled containers in one single operation. The distinguishing characteristic of the process of the invention, where the containers to be tested are placed into an experimental chamber which can be evacuated and which is connected with a pressure gauge which indicates when a predetermined pressure is exceeded—is that the evacuation of the test chamber begins while it is still under atmospheric air pressure and, takes place within a predetermined period of time (not to a predetermined low pressure as customary up to now). After another predetermined period of time, the pressure gauge indicates if the pressure in the test chamber exceeds the predetermined limit.

Figure 1:
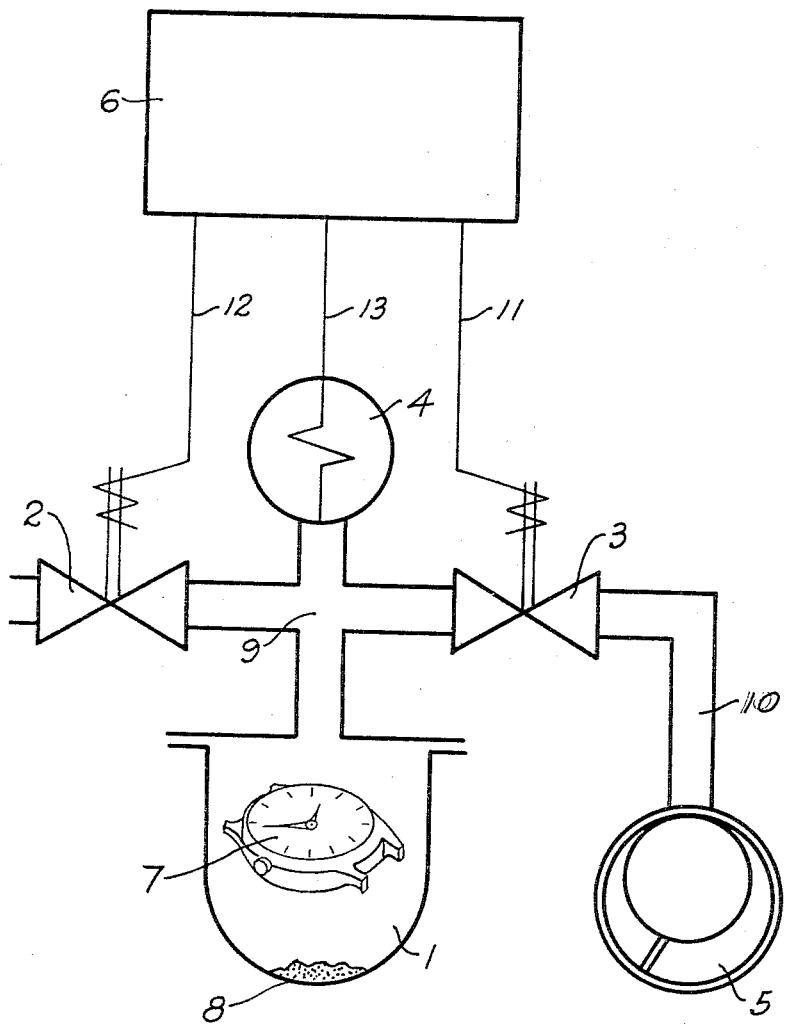

This process and the simple method of carrying it out in accordance with the invention are explained in more detail by means of the attached sketch. Numeral 1 of FIGURE 1 represents the experimental chamber, 2 and 3 magnetically operated valves, 4 an electric vacuum measuring device or a gauge actuated by a certain adjustable pressure, 5 a vacuum pump, 6 a control device which operated the valves, the pump and the measuring device automatically in accordance with the process described below step by step, 7 the test piece, for instance a watch case, 8 a water vapor absorbing substance, for instance $P_2O_5$, and 9 and 10 gas transporting connections between the experimental chamber, the valves, the vacuum gauge and the pump, as shown in the drawing. The requisite electrical connections between the magnetic valves and the measuring device or gauge and the control device are numbered 11, 12 and 13.

Figure 2:
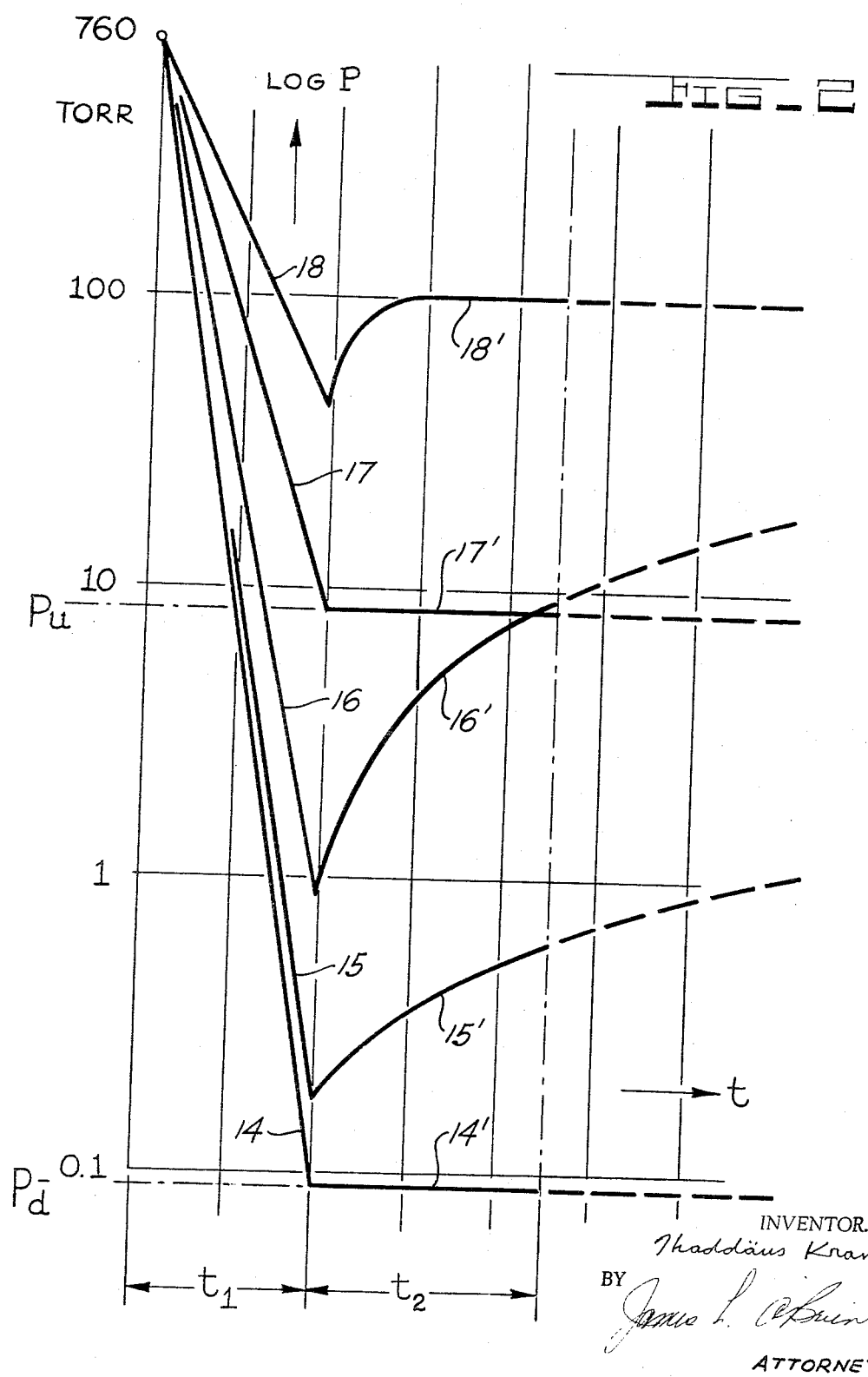

For a leak test, the closed case 7 is placed in the experimental chamber 1. The pump 5 is put into operation with valve 2 closed and valve 3 open. Depending on the capacity of the pump, a quick drop of pressure is achieved in the experimental chamber which, for a certain example wherein the case of the test piece is absolutely leak tight, follows curve 14 in FIGURE 2. The pressure drop during the evacuation phase will be the same (curve 14) if the test piece has very small leaks, i.e., they will not become evident during the evacuation phase. Larger leaks, however, cause a slower drop of pressure, i.e., as represented by either of the curves 15, 16, 17 or 18 of FIGURE 2. After a first predetermined time $t_1$, 10 to 20 seconds for instance, valve 3 is closed cutting off completely the connection between pump 5 and experimental chamber 1. Contrary to certain known leak testing methods the pressure achieved in the experimental chamber at that time need not be determined. The decision about acceptability of the piece is made after the experimental chamber has been sealed off by valve 3 and a certain second predetermined time $t_2$ (of approximately the same length as $t_1$) has elapsed, on the basis of the absolute pressure prevailing in the experimental chamber at this time. The approximate leakage of the test piece, as shown hereinafter, is acceptable if it is below a limit which can be calculated with exactness when the absolute pressure in the experimental chamber is below the preset pickup value of the measuring device. Contrary to known processes, the increase in pressure in the experimental chamber during $t_2$ does not matter. Only the absolute pressure need be measured and not the difference between two such pressures which becomes more difficult and more inaccurate for smaller sealed containers. Lines 14' to 18' of FIGURE 2, for instance, show how the pressures during the time $t_2$ rise with different size leaks in the test piece. Curve 17/17' is interesting in that it reveals that a test piece with a very large leak, which can be designated as "totally untight," no longer shows an increase in pressure during $t_2$, and can no longer be distinguished from the absolutely tight test pieces according to curve 14/14' with the conventional pressure increase method. It is furthermore noteworthy that a totally untight test piece can, under certain circumstances, cause a better ultimate vacuum in the experimental chamber than another test piece that, being in accordance with curve 18/18', is less leaky. In any case, the pickup limit of the measuring device 4 is preadjusted in the process of this invention so that it lies below $P_u$ in the case of a "totally untight" test piece and above the ultimate pressure $P_d$ in the case of an absolutely leak tight test piece. The two pressure limits $P_u$ and $P_d$ are best established empirically by a preliminary test.

Letting $V_k$ be the volume of the experimental chamber (in liters), $V_b$ the displacement volume of the test pieces (in liters), P the pressure in toor prevailing in the experimental chamber at the end of the time period $t_2$, $P_d$ the pressure which would result in case of an absolutely leak tight test piece, S the pump capacity on the plane adjacent to the experimental chamber (in liters per second), and $t_1$ and $t_2$ the above defined time periods (in seconds), the following formula for leak size L will result:

$$L = (V_k - V_b) \frac{(P - P_d)}{(t_2 + (V_k - V_b)/s)} \text{ (torr} \times \text{liter per second)}$$

which, by inserting the constant values for a certain test series $$C_1 = \frac{V_k - V_b}{t_2 + (V_k - V_b)/s} \quad C_2 = -C_1 P_d$$

changes to:

$$L = C_1 P + C_2$$

As is evident this is a simple linear relation so that the process of the invention can be utilized very well not only for qualitative testing but also for quantitative measurements.

In order to determine the degree of leak of a certain test piece, it is only necessary to adjust the pickup limit of the perssure gauge so it just discriminates the test piece in question. On the other hand, when mass testing production, the pick-up value will be adjusted (between $P_u$ and $P_d$) in such a way that only test pieces with too much leakage are excluded.

By opening valve 2 after testing or measuring, the experimental chamber is brought into connection with the free atmosphere, opened and the test piece removed. When mass testing many pieces it may be practical (depending on resulting statistics) to place a larger number of test pieces into the experimental chamber. The device will indicate when one or more of the test pieces have intolerable leaks.

If very small leaks are to be detected, it is recommended to work with very low pressures $P_d$, that is under high vacuum (within $10^{-3}$ torr). The humidity adhering to the inside of the experimental chamber and to the outside of the test pieces can become a distorting influence. Leakage is simulated by gas emission from inside the test pieces which is caused by water vapor desorption. The derogatory influence of the water vapor can be completely eliminated, however, by placing in the experimental chamber, known means of water vapor absorption, $P_2O_5$ for instance.

In general, the volume of the experimental chamber should be in the same size range as that of the containers to be tested so that even a small emission of gas from these containers into the experimental chamber exerts a strong influence on evacuation characteristics and ultimate pressure.

I claim:

A process for testing a closed gas-filled container for leak tightness comprising the steps of:

placing the container in a chamber, establishing a predetermined starting pressure in said chamber;

pumping gas from said chamber for a predetermined first time duration;

waiting a predetermined second time duration after cessation of first time duration; and determining if the absolute pressure in said chamber exceeds a predetermined value at the end of said second time duration.

References Cited by the Examiner

UNITED STATES PATENTS

| | | | |
|---|---|---|---|
| 2,784,373 | 3/1957 | Lawrence et al. | 73—49.3 X |
| 3,047,993 | 8/1962 | Robbins | 73—49.3 X |
| 3,177,704 | 4/1965 | Strange | 73—49.3 |
| 3,221,539 | 12/1965 | Evans et al. | 73—49.2 X |

LOUIS R. PRINCE, *Primary Examiner.*

DANIEL M. YASICH, *Assistant Examiner.*